Patented May 18, 1926.

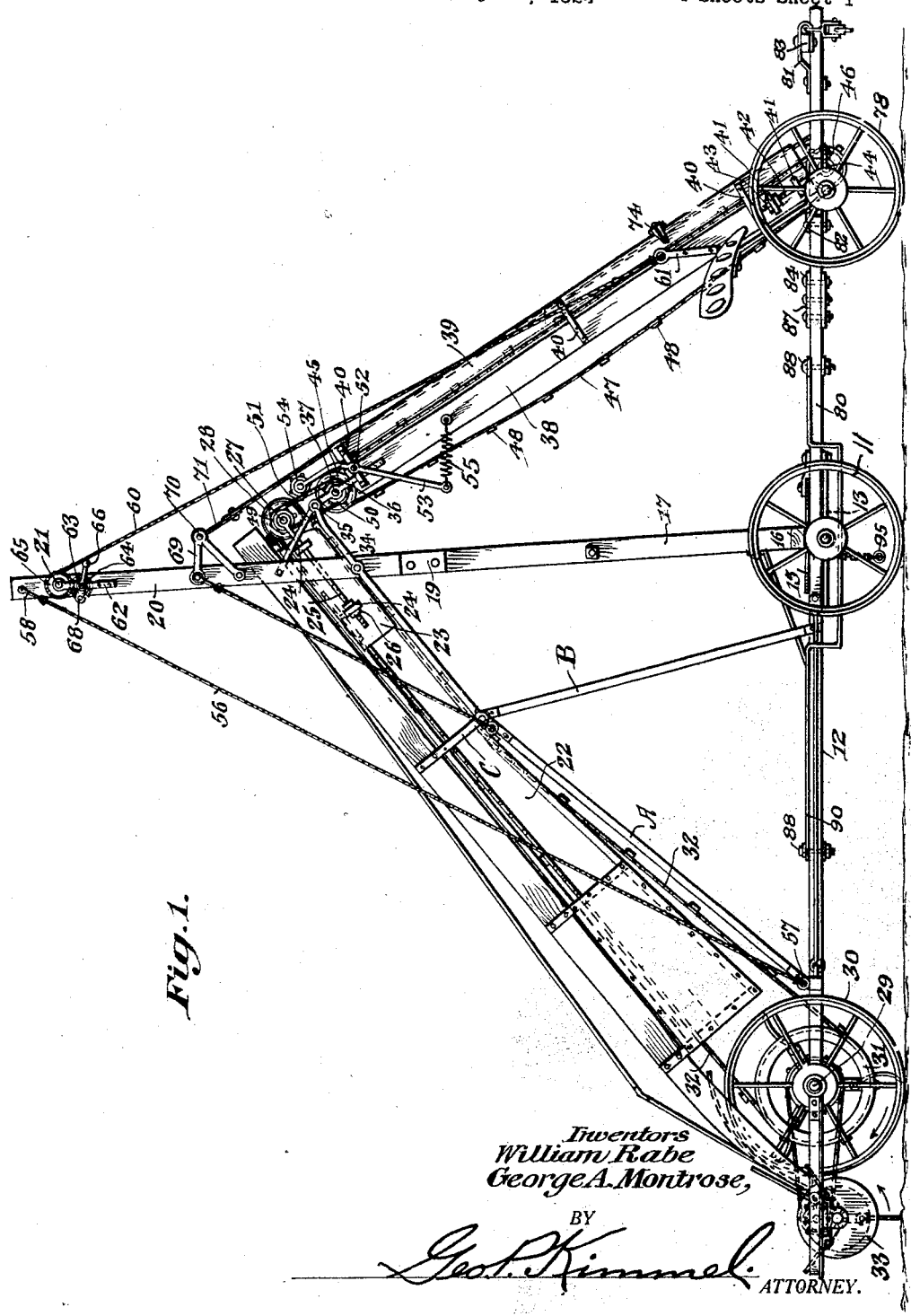

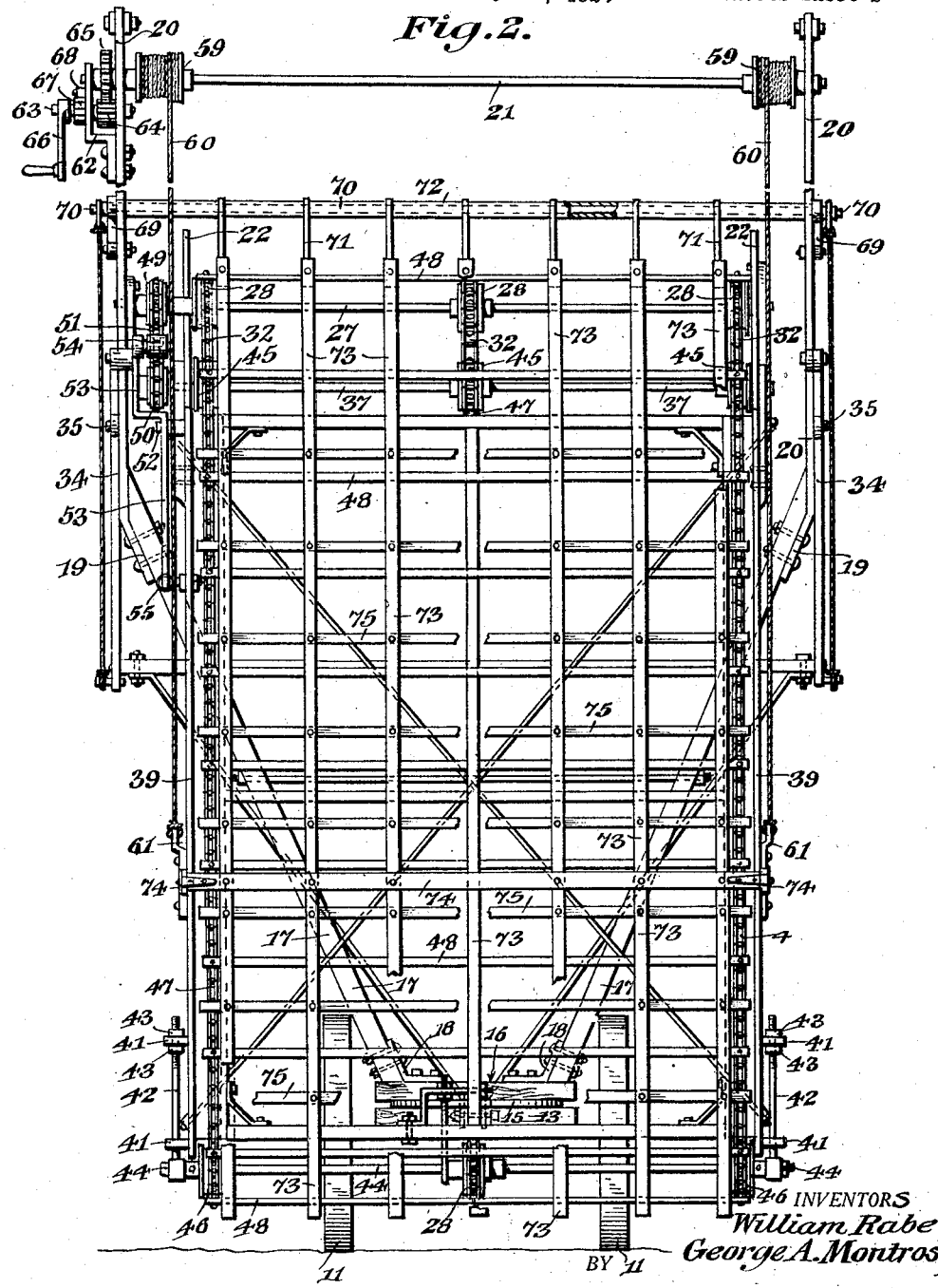

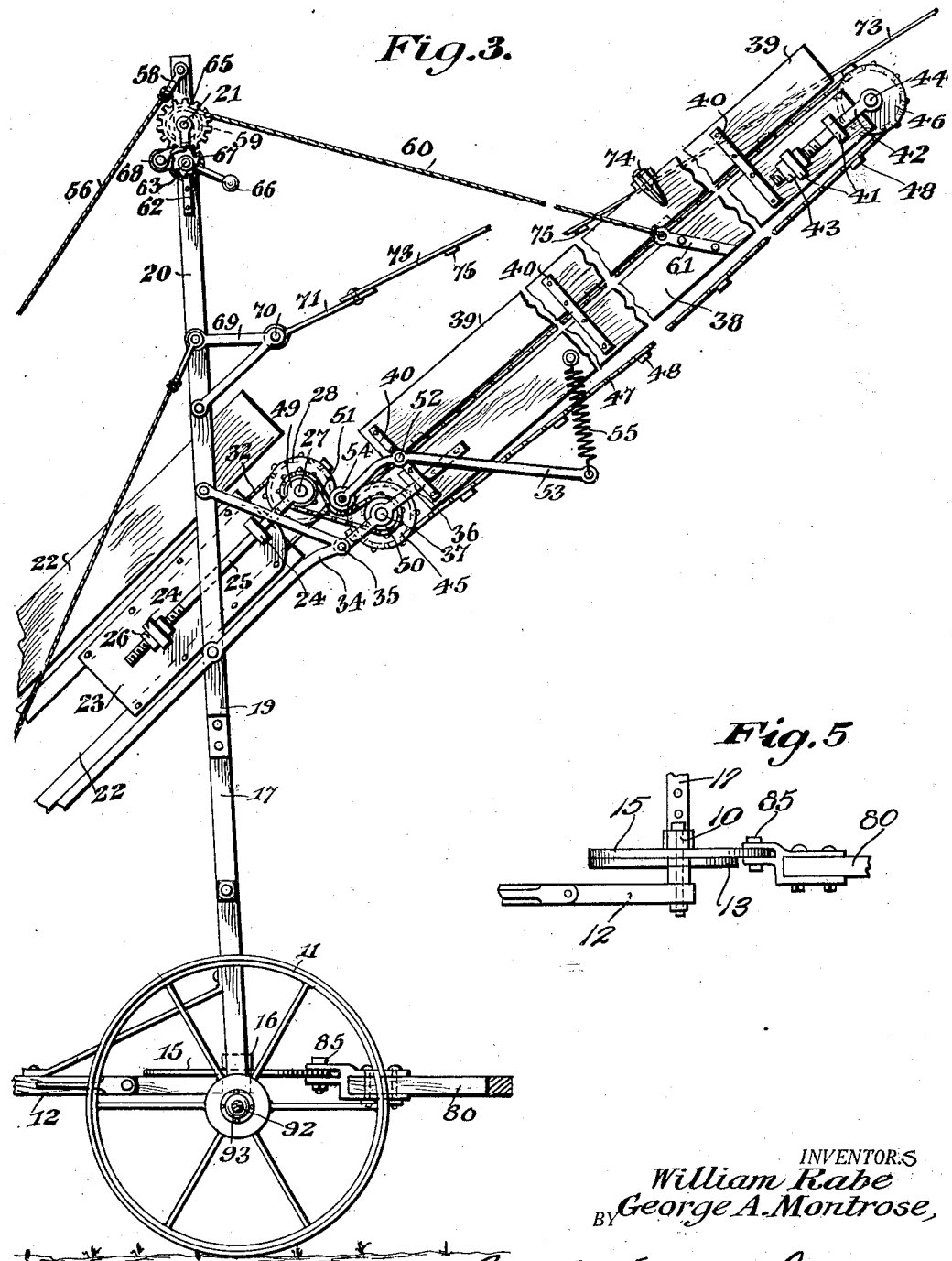

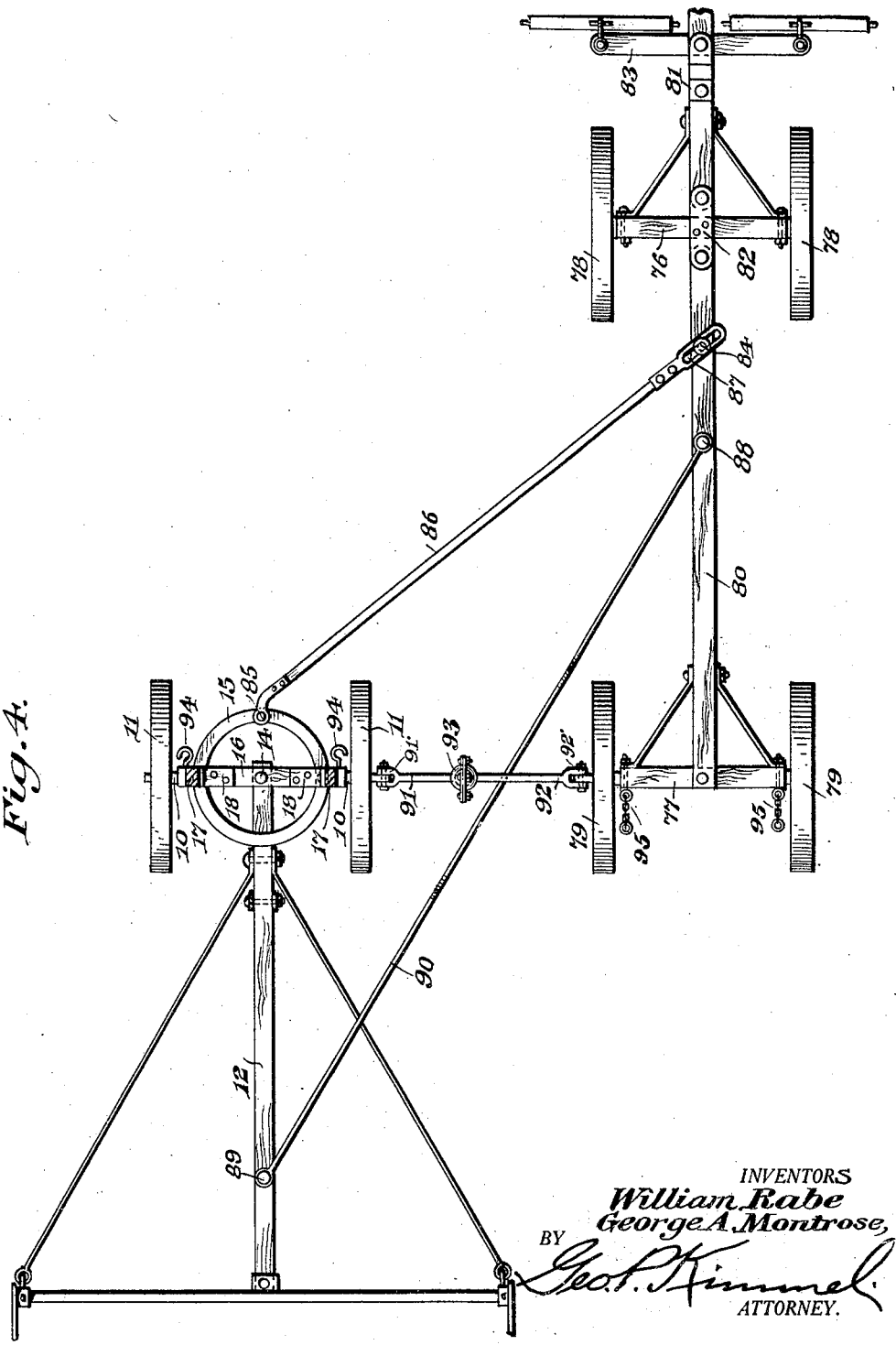

1,585,601

UNITED STATES PATENT OFFICE.

WILLIAM RABE AND GEORGE A. MONTROSE, OF GARDNERVILLE, NEVADA.

HAY-LOADER ATTACHMENT.

Application filed July 22, 1924. Serial No. 727,471.

This invention relates to hay harvesting apparatus and has for one of its objects to provide an attachment whereby the gathering of the hay is expedited, and the apparatus is adapted to be operated separately from the load carrying wagon, and is so designed that the hay can be evenly loaded on the wagon.

Another object of the invention is to provide a device of this character having a draft appliance capable of being coupled to the loader and its attachment at one side of the center, a draft equalizer whereby side draft is practically eliminated, and so arranging the parts as to permit a continuous haul or without the necessity for uncoupling the loader to attach the same to the loading wagon.

Another object of the invention is to provide a device of this character, which may be attached without material structural change to hay loaders of various makes.

Another object of the invention is to provide a device of this character, including a hay elevating and distributing attachment adapted to be attached to a hay harvesting or gathering apparatus, and operative independently of the load receiving wagon, so that the wagon may be disposed in position to receive its load without the necessity of coupling the same to the gathering apparatus.

With these and other objects in view the invention consists of certain novel features of construction as hereinafter shown and described and then specifically pointed out in the claim, and in the drawings illustrative of the preferred embodiment of the invention.

Figure 1 is a side elevation of a conventional hay gatherer with the elevating attachment applied and in position for transportation.

Figure 2 is a front elevation of the device arranged as in Figure 1.

Figure 3 is a side elevation of a portion of the gathering apparatus, with the elevating attachment applied, and in operative position.

Figure 4 is a plan view of the truck portions of the apparatus and the draft equalizing attachments.

Fig. 5 is a detail view of the fifth wheel mechanism of the truck.

The improved apparatus includes coacting trucks, one truck to carry the elevated end of the hay gathering apparatus and the inner end of the elevating and distributing attachment, and other truck located at one side of the line of draft of the hay gathering apparatus and to which the draft element of the hay gathering apparatus is coupled, the hay gatherer truck being coupled to the hauling truck by improved draft appliances whereby side draft is practically eliminated.

The truck of the hay gatherer apparatus comprises an axle 10, having carrier wheels 11, a reach 12, and a base portion 15 in the form of the well known fifth wheel, which as is known comprises two circular elements bearing one against the other, the top one only being shown. (See Figure 4). This upper element 15 swings about the king pin 14.

Connected rigidly to the swivel member 15 is a beam 16 from whose outer ends supporting members or standards 17 rise, and are inclined upwardly and outwardly as shown in Figure 2, and are coupled to the member 16 by brackets 18.

At their upper ends the standards 17 are coupled at 19 to vertical supports 20, and journalled through the members 20 near their upper ends is a shaft 21.

A hay gathering apparatus is represented conventionally, and includes side rails or supports, one of which is represented at 22, and attached to the outer faces of the members 22 are cheek plates, one of which is represented at 23. Each of the cheek plates is provided with guide lugs 24 in spaced relation and through which supporting rods 25 are adjustably supported, and adjustable by set nuts 26. At their outer ends the rods 25 are formed with eyes to support a shaft 27 transversely of the members 25 and of the rail members 22 and carrying chain pulleys 28. At its lower end the gatherer structure is supported on an axle 29 and bearing wheels 30. The axle 29 also supports chain wheels, one of which is shown at 31, in alinement with the chain wheels 28, to receive endless slotted elevator chains indicated at 32.

The hay gatherer likewise includes gathering rakes indicated conventionally at 33, but as the hay gatherer mechanism is no part of the present invention, it is not deemed necessary to further describe the same. The adjustable rods 25 provide effectual means for applying strain to the elevator belt 32, as will be obvious.

Attached to the supports 20 are bracket devices 34, and pivoted at 35 in the outer portions of the brackets are bars 36, and mounted for rotation through the bars intermediate their ends is a shaft 37.

Rigidly connected to the bars 36 are the side rails 38 of the improved attachment, the rails extending in parallel relation, as shown. Disposed in alinement transversely of each of the side rails 38 is a gather board 39, the latter being held in position relative to the side rails by cleats or straps 40.

The frame members 38 together with their attached gatherer boards are free to swing around the pivots 35 as a center.

Near their outer ends the side rails 38 are provided respectively with guide lugs 41 in spaced relation and through which each coacting pair a rod 42 is adjustably supported by set nuts 43. At their outer ends the rods 42 are formed with eyes to rotatively support a shaft 44 in parallel relation to the shaft 37. The shafts 37 and 44 are provided respectively with chain pulleys 45 and 46 over which endless chains 47 operate, the latter being coupled by spaced slots 48.

Any required number of the chain pulleys 45 and 46 and chains 47 may be employed, but three sets are shown for illustration.

The rods 42 provide an effectual means for controlling the tension of the slatted belt 47—48, as will be obvious.

The shafts 27 and 38 are provided respectively with chain pinions 49 and 50 to receive an endless chain 51, whereby the motion of the main carrier or elevator belt 32 is transmitted to the carrier belt 47—48 of the attachment.

Pivoted at 52 to the framework of the improved attachment, for instance to one of the cleats or straps 40, is a lever arm 53, the latter carrying a tightener pulley or roller 54 at one end to constantly engage the chain 51. At its lower end the lever arm 53 is provided with a pull spring 55 to cause the idler 54 to automatically take up the slack of the chain 51 as the device is adjusted, as hereafter explained.

A guy cable 56 is coupled at one end at 57 to the framework of the gatherer device and at the other end at 58 to one or both of the members 20, to resist the pull of the improved attachment when elevated.

Attached to the shaft 21 are cable winding drums 59 with each of which a pull cable 60 is connected, the cables being coupled at 61 respectively to the side rails 38, as shown.

The shaft 21 is supported at one end by a bracket 62 and journalled in the bracket and in the adjacent member 20 is a stub shaft 63 having a pinion 64 engaging a gear 65 on the shaft 21 and with a turning crank 66 externally of the bracket. The stub shaft 63 is also provided with a stop ratchet 67 engaged by a pawl 68 pivoted on the bracket 62, to hold the shaft 21 and the drums 59 in adjusted position.

By this arrangement, the improved attachment may be elevated into operative position as illustrated in Figure 3, or lowered into inoperative position, as shown in Figures 1 and 2, or held at any intermediate position, as will be obvious.

Attached to each of the members 20 is another bracket 69, and extending between the brackets is a supporting rod 70, and swinging on the rod are a plurality of short bars 71, the rods being retained in spaced relation by sleeve devices 72. The bars 71 are preferably of metal such as steel, and connected to each bar is an elongated finger member 73, the latter extending for a distance beyond the shaft 46 and the lower portion of the carrier belt 47, as shown.

Attached to the gather boards 39 and extending transversely thereof is a combined stay and guard member 74, and beneath which the finger members 73 extend and by which they are prevented from being upwardly displaced during the adjustments.

The finger members 73 are connected at intervals by transverse strips 75, the two portions 74 and 75 coacting to form a lattice like device to bear upon the gavel of hay as it is carried along by the slatted belt 47—48 and retain it in position and prevent it from being displaced during its passage.

The hauling truck for the improved device comprises the forward axle 76, rear axle 77, forward carrier wheels 78, rear carrier wheels 79, reach device 80, draft tongue 81 rigidly coupled at 82 to the forward axle 76 and to the reach 80, and supporting the draft appliances 83.

Extending from the reach 80 is a headed pin 84, and pivoted at 85 to the rotating member 15 is a rod 86, the rod being slotted at 87 at its other end to slidably engage the pin 84. Pivoted at 88 to the reach 80 and at 89 to the reach 12, is a pull rod 90.

An extension 91 is swingingly coupled at 91′ to the axle 10 while a similar extension 92 is swingingly coupled at 92′ to the axle 77, the two extensions being coupled at their confronting ends by a universal joint 93.

By this arrangement the hay gatherer device and the improved attachment are located constantly in longitudinal alinement, while the pulling truck is at one side of the line of draft with the improved attachment overhanging the space forwardly of the hay gathering apparatus and at one side of the hauling truck, and the wagon to receive the hay which is gathered is located within this space, and is provided with its own draft means, such as teams of horses, a tractor or the like, while the hauling truck will be provided with a separate draft means. The wagon after receiving its load can be driven to the stack or barn and replaced by an empty wagon, and without disturbing the gathering or distributing apparatus. The rails 22 of the frame of the hay gathering apparatus are supported through the medium of the upwardly converging braces A and B, connected to and rising from the truck and these braces are supplemented by the members 34, which have been hereinbefore described. The braces A and B at their lower ends are fastened in any suitable manner so that said braces serve as a tripod for the frame 22, while the upper ends of said braces are joined to the brackets C on opposite sides of the frame and fastened to its rails 22. These brackets C are common to the braces, as will be apparent in Figure 1 of the drawings.

The forward axle 10 of the truck of the gathering apparatus is provided with draft hooks 94, while the rear axle 77 of the hauling truck is provided with sections of chains 95, so that by disconnecting the joint 92 and the draft rods 86 and 90, the hauling truck may be coupled to the truck of the gathering apparatus. This locates the forward portion of the hauling truck in position to support the outer end of the distributing attachment when the latter is lowered, or disposed in position for transportation from place to place when not in use.

When the truck is disconnected, the extension 91 and 92 may be turned upward out of the way.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:

In an apparatus of the class described, a truck, standards rising from said truck, a supporting frame connected with the truck and extended between the standards, a conveyor belt mounted in said frame, a support, means for swingingly connecting said support to said standards, an endless carrier mounted in said support, alined chain wheels associated respectively with said conveyor belt and carrier, an endless chain engaging over said chain wheels, a lever arm swinging upon said support and carrying a bearing pulley, and a spring engaging said lever arm and operating to maintain said pulley constantly in engagement with said chain.

In testimony whereof, we affix our signatures hereto.

WILLIAM RABE.
GEORGE A. MONTROSE.